United States Patent [19]

Taubitz et al.

[11] Patent Number: 4,618,633

[45] Date of Patent: Oct. 21, 1986

[54] HALOGEN-FREE SELF-EXTINGUISHING THERMOPLASTIC MOLDING MATERIAL

[75] Inventors: Christof Taubitz, Wachenheim; Volker Muench, Ludwigshafen; Juergen Hambrecht, Heidelberg; Adolf Echte, Ludwigshafen; Karl H. Illers, Otterstadt, all of Fed. Rep. of Germany

[73] Assignee: BASF Aktiengesellschaft, Ludwigshafen, Fed. Rep. of Germany

[21] Appl. No.: 772,662

[22] Filed: Sep. 5, 1985

[30] Foreign Application Priority Data

Sep. 6, 1984 [DE] Fed. Rep. of Germany ....... 3432750

[51] Int. Cl.$^4$ .......................... C08K 3/02; C08K 5/51; C08K 5/52; C08K 5/53
[52] U.S. Cl. ...................... 524/80; 524/117; 524/119; 524/120; 524/123; 524/127; 524/133; 524/141; 524/143; 524/414; 524/417; 525/68; 525/134
[58] Field of Search ............... 524/117, 119, 120, 141, 524/143, 80, 128, 123, 126, 127, 133, 414, 417; 525/68, 117, 134, 142, 328.8, 342, 504

[56] References Cited

U.S. PATENT DOCUMENTS

| | | | |
|---|---|---|---|
| 2,816,085 | 12/1957 | Anas et al. | 525/504 |
| 3,383,435 | 5/1968 | Cizek | 260/874 |
| 4,198,492 | 4/1980 | Izawa et al. | 525/134 |
| 4,228,063 | 10/1980 | Gransow | 260/45.7 |
| 4,350,793 | 9/1982 | Schmidt et al. | 525/133 |
| 4,360,618 | 11/1982 | Trementozzi | 524/141 |
| 4,387,189 | 6/1983 | Brandstetter et al. | 525/68 |
| 4,446,265 | 5/1984 | Braksmayer et al. | 525/68 |

*Primary Examiner*—Veronica P. Hoke
*Attorney, Agent, or Firm*—Keil & Weinkauf

[57] ABSTRACT

A halogen-free self-extinguishing thermoplastic composition comprising as the flame retardant, one or more phosphorus-containing compounds or elemental phosphorous, a polyphenylene ether, a styrene-acrylonitrile copolymer, a phenol/aldehyde resin, a terpolymer of styrene, acrylonitrile and a hydroxy-containing ester of acrylic or methacrylic acid on which a polyphenylene ether is grafted, and optionally, a diene elastomer having grafted thereon styrene and acrylonitrile monomers.

5 Claims, No Drawings

HALOGEN-FREE SELF-EXTINGUISHING THERMOPLASTIC MOLDING MATERIAL

The present invention relates to a halogen-free self-extinguishing thermoplastic molding material which consists of A: 3–97% by weight of one or more halogen-free thermoplastic resins which contain as copolymerized units ($a_1$) 60–91% by weight, based on A, of one or more vinylaromatic monomers with 8 or 9 carbon atoms, and ($a_2$) 40–9% by weight, based on A, of (meth)acrylonitrile, if appropriate B: not more than 40% by weight of an elastomer which has a glass transition temperature below 0° C. and is used in the form of a graft copolymer of the monomers $a_1$ and $a_2$ of component A, C: 97–3% by weight of a further halogen-free thermoplastic resin, D: 0.5–40% by weight of one or more phosphorus-containing compounds (flameproofing agents) and E: 4–30% by weight of one or more phenol/aldehyde resins, the percentages in each case being based on the molding composition.

Relevant prior art publications relating to the flameproofing of thermoplastics include (1) Vogel, Flammfestmachen von Kunststoffen, Hüthig-Verlag, Heidelberg (1966) pages 94 to 102, (2) Troitzsch, Brandverhalten von Kunststoffen, Hanser-Verlag, Munich (1982), pages 1 to 65, (3) Hirschler, in Developments in Polymer stabilization, volume 5, Editor G. Scott, Applied Science Publishers, London (1982), pages 107 to 151, (4) U.S. Pat. No. 4,228,063, (5) U.S. Pat. No. 4,350,793, (6) U.S. Pat. No. 3,383,435, (7) U.S. Pat. No. 4,360,618 and (8) German Patent Application P 34 01 835.2.

The flameproofing of thermoplastics is disclosed in (1), (2) and (3). When relatively large amounts of halogen-containing flameproofing agents are employed and synergistic agents are also used, thermoplastics do not drip flaming particles after application of a hot flame and are self-extinguishing. In the absence of a synergistic agent, this self-extinguishing effect occurs only after the addition of a much larger amount of halogen-containing flameproofing agents. Molding materials treated in this manner have disadvantages which are generally not accepted by the processor. Typical examples are the discoloration of molding materials and the corrosion of processing apparatuses. When synergistic agents are not used, the amount of flameproofing agent has to be increased, which has a highly adverse effect on the thermoplastics treated with it and, because the heat distortion resistance substantially decreases, results in the dripping of flaming particles. These problems can therefore only be solved by decreasing the amount of halogen-containing flameproofing agents. When this is done, however, the thermoplastics then frequently no longer qualify for classification UL 94 V0 or UL 94 V1.

Apart from the abovementioned possibility of treating thermoplastics with halogen-containing flameproofing agents, it is also possible to use halogen-free flameproofing agents. For example, blends of poly(2,6-dimethyl-1,4-phenylene) ether (PPE) and high-impact polystyrene (HIPS) can be flameproofed by phosphorus-containing organic compounds. From 50 to 60% by weight, based on HIPS, of PPE and phosphorus compounds are added (cf. (4) and (5)).

The preparation of blends of poly(phenylene) ether (PPE) with styrene polymers is described in detail in (6). Homopolystyrene (PS), acrylonitrile/butadiene/styrene polymers (ABS) and/or elastomer-modified polystyrene (HIPS) are added to the PPE.

Blends of PPE with polymers such as SAN and ABS which additionally contain acrylonitrile (AN) have not been among those preferably used to date since the properties of the moldings are well below expectations and the moldings therefore cannot be used commercially.

(7) therefore proposes the use of polystyrenes having AN contents of only 2–8% by weight. At an AN content as low as 8.5%, the blends possess poorer mechanical and thermal properties.

Blends with conventional SAN polymers which contain 25–35% of AN thus have very poor mechanical and thermal properties.

It has been found that, for example, SAN/PPE or ABS/PPE blends whose SAN or ABS components have a nitrile monomer content of 8% by weight cannot be flameproofed in the above manner, ie. with phosphorus compounds alone.

Finally, (8) describes the treatment of thermoplastics, eg. SAN or ABS, with halogen-free flameproofing agents, using a system consisting of a nitrogen-containing compound, a phenol/aldehyde resin and a phosphorus-containing organic compound.

It is an object of the present invention to provide a halogen-free flameproofing system for SAN/PPE or ABS/PPE blends which does not have the abovementioned disadvantages. This halogen-free flameproofing system should permit classification as UL 94 V1 and UL 94 V0 and prevent molding materials to which a flame has been applied from dripping both flaming and non-flaming particles. The transparency of the moldings should also be retained.

We have found that this object is achieved by a halogen-free, flameproofed thermoplastic molding material according to claim 1.

The present invention therefore relates to halogen-free, self-extinguishing thermoplastic molding materials which consist of A: 3–97% by weight of a halogen-free thermoplastic resin which contains as copolymerized units ($a_1$) from 60 to 91% by weight, based on A, of one or more vinylaromatic monomers from the group consisting of styrene, α-methylstyrene, p-methylstyrene or mixtures of these and ($a_2$) from 40 to 9% by weight, based on A, of acrylonitrile, B: from 0 to 40% by weight of an elastomer from the group consisting of polybutadiene, polyacrylates and copolymers of the monomers of these polymers (rubber), which has a glass transition temperature below 0° C. and is used in the form of a graft copolymer formed from monomers ($a_1$) and ($a_2$) of component A as the grafted shell and one of the above rubbers as a base, C: 97–3% by weight of a further halogen-free thermoplastic resin which differs from A, D: 0.5–40% by weight of a phosphorus-containing compound (flameproofing agent) and E: 4–30% by weight of a phenol/aldehyde resin, the percentages in each case being based on the molding material consisting of A, B, C, D, E and F,
wherein component C is a poly(phenylene) ether of the general formula (I)

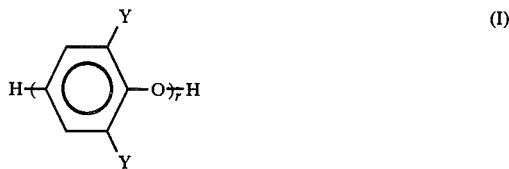

where Y is a monovalent substituent, such as H or a hydrocarbon radical which does not possess a tertiary carbon atom in the α-position and is of 1 to 25 carbon atoms or alkoxy of 1 to 25 carbon atoms, and r is an integer of from 20 to 200, in particular from 30 to 150, and the molding material furthermore contains F: 0.3–95% by weight of a copolymer which consists of a main chain and one or more side chains attached to this by condensation, the main chain having a weight average molecular weight $\overline{M}_w$ of from 5,000 to 5 million and the side chain or chains each having a weight average molecular weight of from 2,000 to 80,000, determined by gel permeation chromatography, the main chain furthermore constitutes a terpolymer which contains, as copolymerized units, ($f_a$) 60–91% by weight of one or more vinylaromatic monomers of 8 or 9 carbon atoms, ($f_b$) 40–9% by weight of acrylonitrile and ($f_c$) 0.3–10% by weight of one or more monomers from the group consisting of the esters of acrylic acid and methacrylic acid which contain alcohol radicals capable of ether formation, and each side group possesses one or more poly(phenylene) ether radicals (PPE) which bind the polymer —X—PPE of the side group to the monomer or monomers ($f_c$) capable of ether formation, binding taking place in each case via the group X, ie. a radical of a bifunctional or polyfunctional coupling agent.

The composition of the novel molding material and the preparation of its components are described below.

The molding material is composed of components (A) to (F), ie. the sum of the 6 components is 100%. Each of the components (A) to (F) is known per se. What is novel and inventive is the use of novolaks (linear, non-crosslinked phenol/aldehyde resins) to compensate the decrease in heat distortion resistance resulting from the addition of phosphorus flameproofing agents without advantageous properties, such as the self-extinguishing property, the lack of dripping of particles and good transparency, being lost as a consequence.

The novel molding material consists of
1. 3–97, in particular 3–60, preferably 3–50, % by weight of component (A),
and may contain
2. 0–40, in particular 0–30, preferably 0–25, % by weight of component (B)
3. 97–3, in particular 60–10, preferably 50–20 % by weight of component (C),
4. 0.3–95, in particular 1–60, preferably 3–20, % by weight of component (D),
5. 0.5–40, in particular 1–30, preferably 2–50, % by weight of component (E) and
6. 4–30, in particular 6–25, preferably 8–20, % by weight of component (F).

Component A

Component A of the novel molding material is a thermoplastic resin which contains, as copolymerized units, ($a_1$) 60–91% of one or more vinylaromatic monomers of 8 or 9 carbon atoms and ($a_2$) 40–9% by weight of one or more unsaturated nitriles, the percentages being based on A.

A suitable constituent ($a_1$) of component (A) is styrene, α-methylstyrene, p-methylstyrene or a mixture of these; particularly preferably, styrene alone is used.

Acrylonitrile (AN) is preferably used as constituent ($a_2$) of component (A).

The styrene copolymer (SAN) is prepared by a conventional solution, emulsion or mass polymerization, either continuously or batchwise. The weight average molecular weight $\overline{M}_w$, determined by gel permeation chromatography, is preferably from 10,000 to 1 million. Where component A is made impact resistant, it contains component C, a rubber, in the form of a graft copolymer of the monomers $a_1$ and $a_2$ as the grafted shell and, preferably, polybutadiene or, if appropriate, crosslinked polyacrylates or copolymers of acrylic acid and butadiene and styrene as the grafting base.

Component B

Component A of the novel molding material is made impact resistant by using rubbers [component (B)].

Rubber (B) should have a glass transition temperature [according to K. H. Illers and H. Breuer, Kolloid-Zeitschrift 176 (1961), 110] of less than 0° C. Examples of suitable rubbers are polybutadiene, polyacrylates obtained from esters of acrylic acid where the alcohol radical is of 2 to 8 carbon atoms (cf. German Laid-Open Applications DOS 1,420,775 and DOS 1,495,089), copolymers consisting predominantly of butadiene and styrene, and those of butadiene and esters of acrylic acid where the alcohol radical is of 2 to 8 carbon atoms.

To prepare impact-resistant copolymers of the component (A), grafted rubbers, preferably those based on polybutadiene, are required. Suitable rubbers of this type are graft copolymers, which are used in amounts of from 5 to 50% by weight, in particular the monomer $a_1$ and $a_2$ of component A in an amount of from 10 to 45% by weight, the percentages in each case being based on component (A).

These graft copolymers are composed of from 10 to 50, preferably from 15 to 45, % by weight of a mixture of one or more vinylaromatic monomers $a_1$ which are of not more than 8 or 9 carbon atoms and from 0.1 to 25, preferably from 5 to 20, % by weight of acrylonitrile ($a_2$) as a grafted shell on from 50 to 90, in particular from 50 to 75, % by weight of the elastomeric grafting base (rubber).

The preparation of the graft copolymers (B) is known per se. They can be prepared by, for example, polymerization of a mixture of, preferably, styrene and AN in the presence of polybutadiene in emulsion, and the particle size can be increased in a conventional manner.

Component (B) can be present as a matrix before the preparation of the novel molding material.

Suitable graft rubbers (B) are therefore $B_1$: 75% of polybutadiene rubber grafted with 25% of styrene/acrylonitrile in a ratio of 90:10, B₂: 75% of polybutadiene rubber grafted with 25% of styrene/acrylonitrile in a ratio of 83:17, B₃: 75% of polybutadiene rubber grafted with 25% of styrene/acrylonitrile in a ratio of 75:25, B₄: 75% of polybutadiene rubber grafted with 25% of styrene/acrylonitrile in a ratio of 70:30, B₅: 75% of a rubber consisting of 60 parts of butyl acrylate and 40 parts of butadiene, grafted with 25% of styrene/acrylonitrile in a ratio of 70:30, B₆: 75% of polybutadiene rubber grafted with 25% of styrene/acrylonitrile in a ratio of 70:30, and B₇: 60% of polybutadiene rubber grafted with 40% of styrene/acrylonitrile in a ratio of 63:35.

Component C

Component (C) of the novel molding material is a thermoplastic poly(phenylene) ether (PPE).

The poly(phenylene) ethers are prepared by oxidative coupling of phenols by a conventional method, as described in, for example, U.S. Pat. Nos. 3,306,879, 3,914,266, 3,956,442, 2,965,069, 3,972,851, 3,496,236, 3,367,978 and 4,140,675.

Preferred poly(phenylene) ethers are those with the general formula (I)

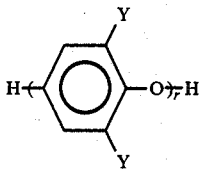

where r is an integer of from 20 to 300, preferably from 30 to 150, and Y is a monovalent substituent, such as hydrogen or a hydrocarbon radical which does not possess a tertiary carbon atom in the alpha position and may be bonded to the phenyl nucleus via an oxygen atom.

Examples are poly(2,5-dilauryl-1,4-phenylene) ether, poly(1,6-diphenyl-1,4-phenylene) ether, poly-(2,6-dimethoxy-1,4-phenylene) ether, poly(2-methoxy-6-ethoxy-1,4-phenylene) ether, poly(2-ethyl-6-stearyloxy-1,4-phenylene) ether, poly(2-methyl-6-methyl-6-phenyl-1,4-phenylene) ether, poly(2,6-dibenzyl-1,4-phenylene) ether and poly(2-ethoxy-1,4-phenylene) ether. Copolymers of various phenols, such as 2,6-dimethylphenol and 2,3,6-trimethylphenol, are also suitable.

Particularly preferred components (C) for the preparation of the novel molding material are those in which, for example, Y is alkyl of 1 to 4 carbon atoms, eg. poly(2,6-dimethyl-1,4-phenylene) ether, poly(2,6-diethyl-1,4-phenylene) ether, poly(2-methyl-6-ethyl-1,4-phenylene) ether, poly-(2-methyl-6-propyl-1,4-phenylene) ether, poly(2,6-dipropyl-1,4-phenylene) ether and poly(2-ethyl-6-propyl-1,4-phenylene) ether.

The poly(phenylene) ethers (PPE) for component (C) are prepared by oxidative coupling of phenols by a conventional method, as described in, for example, U.S. Pat. Nos. 3,306,879, 3,914,266, 3,956,442, 2,965,069, 3,972,851, 3,496,236, 3,367,978 and 4,140,675.

Component D (flameproofing agent)

Component (D) comprises organic and inorganic phosphorus-containing compounds in which the phosphorus has a valence state of from −3 to +5.

Valence state is understood as meaning oxidation state, as described in the Textbook of Inorganic Chemistry by A. F. Hollemann and E. Wiberg, Walter de Gruyter and Co. (1964, 57th to 70th edition), pages 166 to 177 (21).

Phosphorus compounds having valence states of from −3 to +5 are derived from phosphines A(−3), diphosphines (−2), phosphine oxide (−1), elemental phosphorus (O), hypophosphorus acid (+1), phosphorous acid (+3), hypodiphosphoric acid (+4) and phosphoric acid (+5).

Examples of phosphorus compounds of the phosphine class, which have the valence state −3, are aromatic phosphines, such as triphenylphosphine, tritolylphosphine, trisnonylphosphine, trinaphthylphosphine, etc. Triphenylphosphine is particularly suitable.

Examples of phosphorus compounds of the diphosphine class, which have the valence state −2, are tetraphenyldiphosphine, tetranaphthyldiphosphine, etc. The last-mentioned compound is particularly suitable.

Phosphine compounds having a valence state of −1 are derived from phosphine oxide. Examples are triphenylphosphine oxide, tritolylphosphine oxide, trisnonylphosphine oxide and trisnaphthylphosphine oxide. Triphenylphosphine oxide is preferred.

Phosphorus having a valence state of 0 is elemental phosphorus. Red and black phosphorus are suitable, the former being preferred.

Examples of phosphorus compounds having an oxidation state of +1 are hypophosphites. They may be salts of a purely organic nature. The salts contain cations of elements from main groups I, II and III and subgroups I to VIII of the Periodic Table (see Inorganic Chemistry by F. A. Cotton and G. Wilkinson, Verlag Chemie (1967) (22)). Examples are calcium hypophosphite and magnesium hypophosphite. Double hypophosphites having the structure CeMe(H₂PO₂)₆, where Me is erbium, thalium, ytterbium or lutetium, are also suitable. It is also possible to use complex hypophosphites, eg. Me[Zr(H₂PO₂)₆] or Me[Hf(H₂PO₂)₆], where Me is magnesium, calcium, manganese, cobalt, nickel, iron, zinc or cadmium.

In addition to these inorganic hypophosphites, organic hypophosphites are also suitable. Examples of useful compounds are cellulose hypophosphite esters, polyvinyl alcohol hypophosphite esters, esters of hypophosphorous acid with diols, such as 1,10-dodecyldiol. Substituted phosphinic acids and their anhydrides, eg. diphenylphosphinic acid, may furthermore be employed, and melamine hypophosphite is also useful. Other suitable compounds are diphenylphosphinic acid, di-p-tolylphosphinic acid, dicresylphosphinic anhydride, naphthylphenylphosphinic anhydride and phenylmethylphosphinic anhydride. Compounds such as bisesters of hydroquinone, ethylene glycol, propylene glycol, etc. with diphenylphosphinic acid, as well as aryl(alkyl)phosphinamides, eg. diphenylphosphinic acid dimethylamide, and sulfonamidoaryl(alkyl)phosphinic acid derivatives, eg. p-tolylsulfonamidodiphenylphosphinic acid, are also useful. Bisesters of hydroquinone and ethylene glycol with diphenylphosphinic acid are preferably employed.

Phosphorus compounds having the oxidation state +3 are derived from phosphorous acid. Examples are described in U.S. Pat. Nos. 3,090,799 and 3,141,032. Particularly suitable compounds are cyclic phosphonates, such as

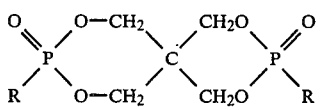

where R is CH₃ or C₆H₅, which are obtained from pentaerythritol,

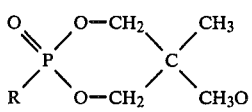

where R is CH₃ or C₆H₅, these compounds being derived from neopentylglycol, and

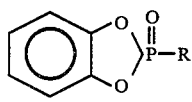

where R is CH₃ or C₆H₅, these compounds being obtained from pyrocatechol.

Phosphorus having a valence state of +3 is furthermore present in triaryl(alkyl) phosphites, such as triphenyl phosphite, tris(nonylphenyl) phosphite, tris(2,4-di-tert.-butylphenyl) phosphite, phenyl didecyl phosphite, etc. However, diphosphites, eg. propylene glycol 1,2-bis-(diphosphite), or cyclic phosphites, such as

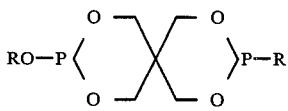

where R is CH₃ or C₆H₅, which are derived from pentaerythritol,

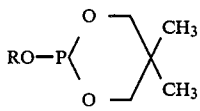

where R is CH₃ or C₆H₅, these compounds being derived from neopentylglycol, and

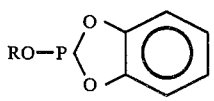

where R is CH₃ or C₆H₅, these compounds being obtained from pyrocatechol, are also suitable.

Methyl neopentyl phosphonate and phosphite and dimethyl pentaerythritol diphosphonate and phosphite are very particularly preferred.

Particularly suitable phosphorus compounds of oxidation state +4 are hypodiphosphates, eg. tetraphenyl hypodiphosphate,

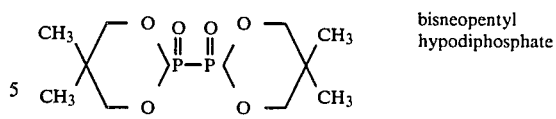
bisneopentyl hypodiphosphate or

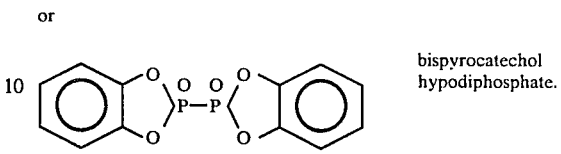
bispyrocatechol hypodiphosphate.

Bisneopentyl hypodiphosphate is preferred.

Particularly suitable phosphorus compounds of oxidation state +5 are alkyl-substituted and aryl-substituted phosphates. Examples are phenyl bisdodecyl phosphate, phenyl neopentyl phosphate, phenyl ethylene hydrogen phosphate, phenyl bis(3,5,5-trimethylhexyl) phosphate, ethyl diphenyl phosphate, 2-ethylhexyl ditolyl phosphate, diphenyl hydrogen phosphate, bis(2-ethylhexyl)-p-tolyl phosphate, tritolyl phosphate, bis(2-ethylhexyl) p-tolyl phosphate, tritolyl phosphate, bis(2-ethylhexyl) phenyl phosphate, di(nonyl) phenyl phosphate, phenyl methyl hydrogen phosphate, di(dodecyl) p-tolyl phosphate, tricresyl phosphate, triphenyl phosphate, dibutyl phenyl phosphate, p-tolyl bis(2,5,5-trimethylhexyl) phosphate and 2-ethylhexyl diphenyl phosphate. Phosphorus compounds in which each radical is aryloxy are particularly preferred, triphenyl phosphate being very particularly suitable.

It is also possible to use cyclic phosphates, diphenyl pentaerythritol diphosphate and phenyl neopentyl phosphate being particularly suitable.

In addition to the above low molecular phosphorus compounds, oligomeric and polymeric phosphorus compounds are also suitable.

Such polymeric organic phosphorus compounds containing phosphorus in the polymer chain are formed, for example, in the preparation of unsaturated pentacyclic phosphine dihalides, as described in, for example, German Laid-Open Application DOS 2,036,174. The molecular weight (measured by vapor pressure osmometry in dimethylformamide) of the polyphospholine oxides should be from 500 to 7000, preferably from 700 to 2000.

Here, the phosphorus has the oxidation state −1.

Inorganic coordination polymers of aryl(alkyl)phosphinic acids, eg. poly[sodium(I) methylphenylphosphinate], copolymers of Zn(II)dibutylphosphinate with Zn(II) dioctylphosphinate, poly[Al(III) tris(diphenyl)phosphinate] or poly[Co(II) Zn(II) bis(dioctyl)phosphinate], may also be used. Their preparation is described in German Laid-Open Application DOS 3,140,520 (26). The phosphorus has the oxidation state +1.

Such polymeric phosphorus compounds can also be formed by reacting a phosphonic acid chloride, eg. phenyl-, methyl-, propyl-, styryl- or vinylphosphonic acid dichloride, with a bifunctional phenol, eg. hydroquinone, resorcinol, 2,3,5-trimethylhydroquinone, bisphenol A, tetramethyl bisphenol A or 1,4′-dihydroxydiphenyl sulfone (cf. U.S. Pat. No. 3,719,272 and W. Sǿrensen and T. W. Champbell, Preparative Methoden der Polymeren-Chemie, Verlag Chemie, Weinheim, 1962, page 123). The intrinsic viscosities ln$\eta_{rel}$/C of these polymers should be from 0.01 to 0.4, preferably from 0.03 to 0.2.

Other polymeric phosphorus compounds which may be present in the novel polymers are prepared by reacting phosphorus oxytrichloride or a phosphoric acid ester dichloride with a mixture of mono-, bi- and trifunctional phenols and other hydroxyl-carrying compounds (cf. Houben-Weyl-Muller, Thieme Verlag, Stuttgart, Org. Phosphorverbindungen, part II (1963)). Polymeric phosphonates may also be prepared by transesterification reactions of phosphonates with bifunctional phenols (cf. German Laid-Open Application DOS 2,925,208) or by reacting phosphonates with diamines, diamides or hydrazides (cf. U.S. Pat. No. 4,403,075). The inorganic compound poly(ammonium phosphate) is also suitable.

It is also possible to use oligomeric pentaerythritol phosphites, phosphates and phosphonates according to European Pat. No. 8,486, of the general formulae II, III and IV:

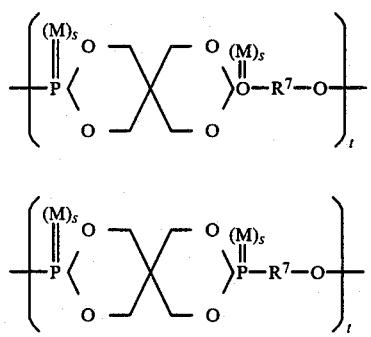

where, in each case, s is 0 or 1, t is 2 to 500, y is 0.5, M is 0.5 and $R^7$ is $—(CH_2—)—_2$ or $—(CH_2—)—_3$,

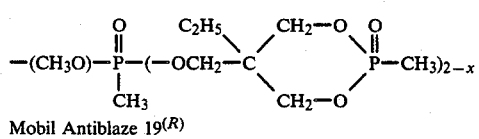

Mobil Antiblaze 19$^{(R)}$ where x is 0 or 1,

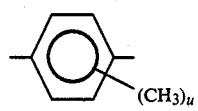

where u is 0 to 4,

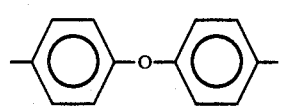

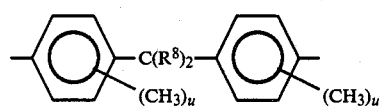

where u is 0 to 4 and $R^8$ is $C_1$–$C_4$-alkyl or H,

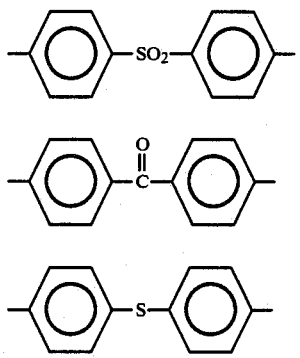

The list is intended to illustrate the invention and does not constitute a restriction.

Triphenylphosphine oxide, triphenyl phosphate, dimethyl pentaerythritol diphosphonate, methyl neopentyl phosphate and Mobil Antiblaze 19 ® are very particularly preferably used.

Component E

Components E of the novel molding material are phenol/aldehyde resins which are known to be prepared by condensation of phenols and aldehydes. Novolaks ® having number average molecular weights $\overline{M}_n$ of from 500 to 2000 are particularly preferably used.

Their preparation is described in, for example, Houben-Weyl, Methoden der organischen Chemie, volume 14, part 2, Georg Thieme Verlag, Stuttgart, 1963, page 201 et seq., or in Sårensen and Champbell, Preparative Methods of Polymer Chemistry, Interscience Publishers, New York, 1968, and the thermodynamic properties of novolak/polymer mixtures are described by Fahrenholtz and Kwei in Macromolecules, 14 (1981), 1076-1079.

Novolaks can be prepared using aldehydes (e₁) of the general formula (V)

$$R^1—CHO \qquad (V)$$

where $R^1$ is H, $C_1$–$C_{10}$-alkyl, cycloalkyl or $C_6$–$C_{12}$-aryl or -aryl-$C_1$–$C_3$-alkyl. Examples are formaldehyde, acetaldehyde, p-propanal, n-butanal, isopropanal, isobutyraldehyde, 3-methyl-n-butanal, benzaldehyde, p-tolylaldehyde, 2-phenylacetaldehyde, etc. Formaldehyde is particularly preferably used.

Suitable compounds are phenols (e₂) of the general formula (VI)

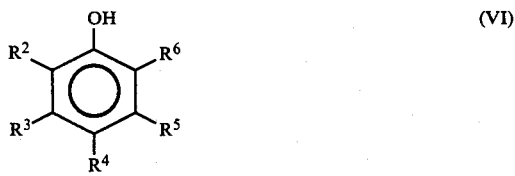

where $R^2$ and $R^6$ are each hydrogen, and $R^3$, $R^4$ and $R^5$ are each hydrogen, $C_1$–$C_{20}$-alkyl, cycloalkyl, $C_6$–$C_{10}$-aryl, $C_1$–$C_6$-alkoxy, cycloalkoxy, $C_6$–$C_{10}$-phenoxy, hydroxyl, carbonyl, carboxyl, cyano, a $C_1$–$C_6$-alkyl ester radical, a $C_6$–$C_{10}$-aryl ester radical, sulfo, sulfonamido, a $C_1$–$C_6$-alkyl sulfonate group, a $C_6$–$C_{10}$-sulfonic acid ester group, a $C_1$–$C_6$-alkyl- or $C_6$–$C_{10}$-arylphosphinic acid group or its $C_1$–$C_6$-alkyl or $C_6$–$C_{10}$-aryl ester, a phosphonic acid group or its mono- or di-$C_1$-$C_6$-alkyl or mono- or di-$C_6$-$C_{10}$-aryl ester or $C_6$-$C_{10}$-aryl-$C_1$-$C_6$-alkyl ester, or where $R^2$ and $R^4$ are each hydrogen and $R^3$, $R^5$ and $R^6$ are each one of the abovementioned radicals.

Typical examples of ($e_2$), without constituting any restriction, are phenol, o-cresol, m-cresol, p-cresol, 2,5-dimethyl-, 3,5-dimethyl-, 2,3,5-trimethyl-, 3,4,5-trimethyl-, p-tert.-butyl-, p-n-octyl-, p-stearyl-, p-phenyl-, p-(2-phenylethyl)-, o-isopropyl-, p-isopropyl-, m-isopropyl-, p-methoxy and p-phenoxyphenol, pyrocatechol, resorcinol, hydroquinone, salicylaldehyde, salicylic acid, p-hydroxybenzoic acid, methyl p-hydroxybenzoate, p-cyano- and o-cyanophenol, p-hydroxybenzenesulfonic acid, p-hydroxybenzenesulfonamide, methyl p-hydroxyphenylphosphinate, 4-hydroxyphenylphosphonic acid, ethyl 4-hydroxyphenylphosphonate, diphenyl 4-hydroxyphenylphosphonate and a large number of other phenols. Phenol, o-cresol, m-cresol, p-cresol, p-tert.-butylphenol, o-tert.-butylphenol and p-octylphenol are preferably used.

However, it is also possible to employ mixtures of these phenols.

Accordingly, the following compounds are preferably used novolaks (E), but do not constitute a restriction:
$E_1$: phenol/formaldehyde novolak,
$E_2$: o-cresol/formaldehyde novolak,
$E_3$: m-cresol/formaldehyde novolak,
$E_4$: t-butylphenol/formaldehyde novolak,
$E_5$: p-octylphenol/formaldehyde novolak and
$E_6$: p-cyanophenol/formaldehyde novolak.

$E_5$ is particularly preferably used.

Examples of preferably employed novolaks obtained from mixtures of phenols ($e_2$) are listed in Table 1. This list is not intended to constitute a restriction.

The composition of the mixtures of phenols is not critical and can vary within the stated limits. In calculating the composition, $$\Sigma \text{ mol \%} = 100$$

$E_{11}$ and $E_{15}$ are preferably used, the formaldehyde novolaks $E_{11}$ and $E_{15}$ composed of 60–70 mol % of o-cresol, 15–20 mole % of m-cresol and 10–20 mole % of p-tert.-butylphenol or p-cresol being very particularly preferably employed.

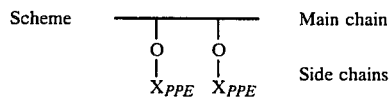

The main chain and side chains are linked via monomers of a special type which are present as copolymerized units in the main chain and carry a side group which can be etherified. For example, hydroxyl-containing monomers are preferred; after the condensation, the radical —X— of a bifunctional coupling agent is bonded to the polyphenylene ether PPE representing the side group (as the total group —XPPE) in the form —O—X—PPE.

The main chain of the copolymer is a terpolymer which contains the hydroxyl-containing monomer as copolymerized units, the said terpolymer containing $f_a$: 91–60% by weight of one or more vinylaromatic monomers of 8 or 9 carbon atoms, $f_b$: 9–40% by weight of acrylonitrile and $f_c$: 0.3–10% by weight of one or more monomers from the group consisting of the esters of acrylic and methacrylic acid which contain hydroxyl groups capable of ether formation, the percentages in each case being based on the main chain.

Suitable monomers $f_a$ are styrene itself or styrene which is alkylated in the nucleus or in the side chain, eg. p-methylstyrene or α-methylstyrene or mixtures of these. Styrene alone is preferably used.

Hydroxyalkyl(meth)acrylates and hydroxyalkyl(meth)acrylamides are preferably used as monomers $f_c$ for effecting bonding to the side chains. Hydroxyethyl(meth)acrylate, hydroxypropyl(meth)acrylate, hydroxybutyl(meth)acrylate, hydroxypentyl(meth)acrylate, hydroxyhexyl(meth)acrylate, hydroxydecyl(meth)acrylate, diethylene glycol mono(meth)acrylate, triethylene glycol mono(meth)acrylate, tetraethylene glycol mono(meth)acrylate, dipropylene glycol mono(meth)acrylate and tripropylene glycol mono(meth)acrylate, as well as hydroxymethylstyrene, are particularly suitable, but mixtures may also be employed.

The weight average molecular weight $M_w$ of the main chain of the copolymer is from 5,000 to 5 million, in particular from 20,000 to 1 million, determined by gel permeation chromatography. The total molecular weight is from 7,000 to 10 million.

Copolymer F consists of 20–85, preferably from 40 to 75, % by weight, of the main chain, and the side chains accordingly account for from 15 to 80, in particular from 25 to 60, % by weight. (The radical of the coupling agent has been disregarded here).

TABLE 1

| | | Examples of preferably used phenol mixtures | | | | |
| | | | Secondary components | | | |
| Name | Main component | o-cresol (mole %) | m-cresol (mole %) | p-cresol (mole %) | p-tert.-butylphenol (mole %) | o-tert.-butylphenol (mole %) |
|---|---|---|---|---|---|---|
| $E_7$ | phenol | (10–40) | — | — | (2–15) | — |
| $E_8$ | phenol | (10–20) | (30–40) | — | — | (5–10) |
| $E_9$ | phenol | (10–40) | (15–20) | — | (2–10) | (1–3) |
| $E_{10}$ | o-cresol | — | (35–45) | — | — | — |
| $E_{11}$ | o-cresol | — | (5–30) | — | (5–30) | — |
| $E_{12}$ | o-cresol | — | — | — | — | (5–40) |
| $E_{13}$ | o-cresol | — | (15–20) | — | (10–20) | — |
| $E_{14}$ | o-cresol | — | (15–20) | — | (5–15) | (2–10) |
| $E_{15}$ | o-cresol | — | (5–30) | (5–30) | — | — |

Component F

Components F are copolymers which consist of a main chain and one or more side chains which are attached to the main chain by condensation.

The PPE present in the side chains of copolymer F is preferably poly(2,6-dimethyl-1,4-phenylene) ether of the formula I (cf. component C where Y is CH₃, and the methods for its preparation which are stated there). The preferred degree of polymerization n of the PPE is 20–200, in particular 30–100, which corresponds to an intrinsic viscosity [η] of 0.5–0.63 dl/g (measured in chloroform).

X is a radical of a bifunctional or polyfunctional coupling agent obtained from an organic or inorganic compound.

Examples of preferred coupling agents are adipic acid dichloride, terephthalic acid dichloride, trimesoyl dichloride, trimellitic acid dichloride, oxalyl dichloride, pimelic acid dichloride, glutaric acid dichloride, benzophenonetetracarbonyl dichloride, oxydiacetyl dichloride, oxybenzoyl dichloride, sebacic acid dichloride and azelaic acid dichloride, as well as phosgene. Other preferred coupling agents are acid halides containing phosphorus or sulfur, eg. sulfuryl dichloride, phosphorus oxytrichloride and alkyl-, aryl- and arylalkylphosphorus dichlorides. Acid chlorides containing silicon or boron are also particularly useful, examples being dialkyl-, -aryl- and -alkylaryldichlorosilanes, dialkoxy-, -aryloxy- and -arylalkyloxydichlorosilanes, methyltrichlorosilane, ethyltrichlorosilane, amyltrichlorosilane and vinyltrichlorosilane. The coupling agents may also be used as mixtures.

Accordingly, examples of particularly preferred groups X are

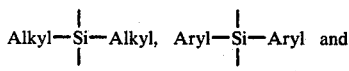

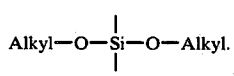

The list is intended as an illustration and does not constitute a restriction.

An unsubstituted or substituted poly(phenylene) ether radical (PPE) is bonded to the coupling agent via a terminal oxygen atom. This poly(phenylene) ether radical of the side chain is preferably of the formula I, as in the case of component C, x preferably being an integer of from 20 to 200.

The composition of the main chain of the copolymer F is preferably matched up with that of the styrene copolymer (component A). Thus, in the case of high acrylonitrile contents (eg. 20–40% by weight) in component A, it is advantageous to choose a similarly high acrylonitrile content for the main chain of the copolymer F.

The preparation of the main chain and side chain of the copolymer F is known per se.

To prepare the component F, the terpolymers of the main chain are reacted with poly(phenylene) ethers (PPE). This is carried out in a conventional manner by the OH coupling reactions conventionally used in organic chemistry; preferably, the PPE is first reacted with a known coupling agent and then with the terpolymer of the main chain. The coupling agents react with the phenolic terminal group and/or, where relevant, with —CH₂OH groups on the aromatic ring of the PPE, which groups may be formed in minor amounts from methyl groups on the aromatic ring during the preparation of the PPE. The coupling agents then have a further functional group for reaction with the terpolymer. The coupling reaction can be carried out in solution, in suspension, or in the melt, or in the form of a multi-phase reaction, eg. a two-phase reaction, preferably in an alkaline medium. Suitable coupling agents are those which react with the phenolic terminal group of the PPE and with the hydroxyl group of the terpolymer.

The coupling agents are preferably first reacted with the PPE and react preferentially with the terminal OH group of the PPE. All OH groups of the PPE are preferably reacted for this purpose in order to functionalize the PPE with the coupling agent. The amount of OH groups in the PPE, which generally has a broad molecular weight distribution, is determined in a conventional manner, for example by IR spectroscopy at 3,460 cm⁻¹ or by titration with butyllithium, the end point being determined by the addition of styrene monomer and the formation of styrene anions. The amount of coupling agent is chosen so that preferably all OH groups are functionalized.

The reaction described above is preferably carried out in an inert solvent, such as cyclohexane, toluene or tetrahydrofuran. It is also possible to carry out a two-phase reaction. The resulting hydrohalic acid is removed either by expelling it or by adding a basic material, preferably a tertiary amine. This reaction is preferably effected at from 0° to 150° C. The reaction temperature is adjusted according to the strength of the base and the boiling point of the solvent.

The resulting functionalized PPE can be worked up by filtration and removal of the solvent. It is reacted with the hydroxyl-carrying terpolymers in solution, in suspension or in the melt or by a multi-phase reaction, such as a two-phase reaction. The reaction is preferably carried out as for the first step, the functionalized PPE polymer being added to the hydroxyl-containing terpolymer all at once or, preferably, in the course of up to 2 hours. The resulting hydrohalic acid is expelled, or bound by means of a basic substance, for example a tertiary amine, which is conventionally used. However, it is also possible to use other acid acceptors. The resulting graft copolymers can be obtained by evaporating off the solvent or by precipitation in methanol.

Additives

The molding material according to the invention can, if required, contain conventional additives, suitable ones being known and proven stabilizers, such as sterically hindered phenols and organic phosphites, these being used in each case in conventional amounts from 0.01 to 0.5% by weight, based on the novel molding material. It is also possible to use sulfur and/or sulfur-containing stabilizers, such as dithiocarbamate complexes, xanthogenates, thiazoles and zinc salts of mercaptobenzimidazoles, these being employed in each case in conventional amounts of from 0.01 to 0.5% by weight, based on the total mixture.

The novel molding material may furthermore contain plasticizers and processing assistants. Other conventional additives are glass fibers, glass spheres, kaolin, quartz, mica, wollastonite, talc, asbestos, titanium dioxide, alumina, muscovite, chalk, calcined aluminum silicate, dyes and pigments.

The preparation of the novel molding material from the components and from any additives used can be carried out by a suitable conventional mixing method, for example in an extruder, kneader or roll mill.

In particular, components B, F, D and E of the novel molding material, separately in the form of powders or in the form of a powdered mixture or as a concentrate in one of the thermoplastics (preferably component A) can be incorporated into the other thermoplastic (component C) in order to obtain the intended composition.

The molding materials according to the invention can be processed to self-extinguishing moldings or profiles by injection molding or extrusion.

The novel molding materials not only are self-extinguishing, possess improved heat distortion resistance and good transparency and do not drip particles during burning but also exhibit good mechanical properties. Furthermore, the high acrylonitrile content which can be used in the novel formulations results in an obvious improvement in the solvent resistance compared with blends of PPE and HIPS.

Surprising and also unforeseeable was the fact that, for example by using component E, the amount of phosphorus compounds (component D) required to achieve the classification UL 94 V0 or UL 94 V1 could be reduced.

The burning tests mentioned in the Examples and Comparative Experiments were carried out as follows:
1. The flammability test was carried out as a vertical burning test according to the specifications of Underwriter's Laboratories, for the purpose of classification in one of the fire classes UL 94 V0, V1 or V2.

A flameproofed thermoplastic is classified UL 94 V0 if the following criteria are satisfied. For a set of 5 samples having the dimensions 127×12.7×3.16 mm, none of the samples must continue burning for longer than 10 seconds after an open flame (height 19 mm) has been applied twice for a period of 10 seconds. The total combustion time for 10 flame applications to 5 samples must not exceed 50 seconds. There must be no dripping of flaming particles, complete combustion, or glowing combustion for longer than 30 seconds. For classification as UL 94 V1, the combustion times must be no longer than 30 seconds and the sum of their combustion times for 10 flame applications to 5 samples must not exceed 250 seconds. Glowing combustion must never last longer than 60 seconds. The remaining criteria are identical to those mentioned above. A material is classified UL 94 V2 when the remaining criteria for UL 94 V1 are satisfied and dripping of flaming particles occurs.
2. The heat distortion resistance, Vicat B, was determined according to DIN 53,460. The data are expressed in °C.
3. The transparency of test specimens was assessed visually and rated as follows: very good, good, moderate, poor.

The substances described below were prepared or used for carrying out tests.

Component A $A_1$: Styrene/acrylonitrile copolymer (SAN) containing 25% by weight of AN; intrinsic viscosity IV=101 (all IV data are based on values measured in 0.5% strength solution in dimethylformamide at 25° C.).
$A_2$: SAN containing 35% of acrylonitrile; IV=80.

Component B $B_7$: 60% of polybutadiene rubber grafted with 40% of styrene/acrylonitrile in a ratio of 65:35.

Component C $C_1$: Poly(2,6-dimethylene-1,4-phenylene) ether, prepared according to U.S. Pat. No. 3,914,266 (8); limiting viscosity $[\eta]=0.60$, measured at 25° C. in chloroform.

Component D $D_1$–$D_3$: The flameproofing agents triphenylphosphine oxide, triphenyl phosphate and Mobil Antiblaze used according to the invention were commercial products.

$D_4$: Neopentyl methylphosphonate 1.240 kg (10 moles) of dimethyl phosphonate are melted with 1.040 kg (10 moles) of neopentylglycol and 0.0495 kg of $MgCl_2$, and the mixture is stirred at from 180° to 190° C. until no more methanol distils off. This takes about 10-16 hours.
Yield (according to gas chromatography): 90%
Melting point: 121°–123° C.
Properties: white crystalline odorless substance.

$D_5$: Dimethylpentaerythritol diphosphonate

The compound is synthesized according to British Pat. No. 2,0834,042. Melting point: 236°–242° C. The following abbreviations are used in the Table:

| | |
|---|---|
| Triphenylphosphine oxide | = $D_1$ |
| Triphenylphosphate | = $D_2$ |
| Mobil Antiblaze 19 ® | = $D_3$ |
| Neopentyl methylphosphonate | = $D_4$ |
| Dimethylpentaerythritol diphosphonate | = $D_5$ |

Component E $E_{11}$: Mixed novolak
11.34 kg of o-cresol, 2.754 kg of m-cresol, 2.925 kg of p-tert.-butylphenol, 5.392 kg of formalin (37% strength in water), 314 g of oxalic acid. $2H_2O$ and 540 g of $CH_3OH$ in 30 l of water are mixed, and the mixture is stirred for 24 hours at 95°–97° C. After this time, the upper aqueous phase is siphoned off, and the lower phase is washed with 10 l of water. The lower, product-containing phase is discharged, and the solvent and 1 part of the readily volatile phenols are stripped off under reduced pressure from a water pump. The remaining melt is freed from the residual phenol at 150° C. and under 0.2–0.4 mbar. The melt is cooled on a tin plate and is comminuted and milled.
Yield: 10.3 kg
Analysis: C 80.0%, H 4.7%, O 13.3%
Molecular weight (determined by vapor pressure osmometry in acetone): 700.

$E_{15}$: Mixed novolak
The novolak ($E_{15}$) is prepared by a similar method from 63.18 kg of p-cresol, 82.62 kg of m-cresol, 340.2 kg of o-cresol and 320.4 kg of formalin (40% strength in water), with the addition of 10 kg of oxalic acid and 35 kg of $CH_3OH$.
Yield: 400 kg
Molecular weight (determined by vapor pressure osmometry in acetone): 1000.

Component F $F_1$: 100 g of PPE (prepared as described in U.S. Pat. No. 3,914,266 and having a limiting viscosity $[\eta]$ of 0.60 ml/g, measured at 25° C. in chloroform) are reacted with dimethyldichlorosilane in toluene, using tributylamine as an acid acceptor. The reaction product is then run into 100 g of a styrene copolymer (which consists of 72% by weight of styrene, 25% by weight of acrylonitrile and 3% by weight of hydroxybutyl acrylate, has an $\overline{M}_w$ of 60,000 and is prepared by continuous polymerization) in toluene in the course of 20 minutes, tributylamine being used as the acid acceptor. The graft polymer (copolymer consisting of main chains and side chains) is obtained by removing the solvent.

$F_2$: 100 g of PPE (as described in $F_1$) are reacted with dimethyldichlorosilane. The reaction product is then run into 120 g of a styrene copolymer (as described in $F_1$) in toluene. The resulting copolymer ($F_2$) is used for preparing the novel blends.

$F_3$: 100 g of PPE (as described in $F_1$) are reacted with dimethyldichlorosilane in toluene. The reaction product is then added to 100 g of a styrene copolymer (which consists of 62% by weight of styrene, 35% by weight of acrylonitrile and 3% by weight of hydroxybutyl acrylate, has an $\overline{M}_w$ of 60,000 and is prepared by continuous polymerization). The copolymer ($F_3$) is obtained.

EXAMPLES 1 TO 9 AND COMPARATIVE EXAMPLES A TO J

The Examples which follow illustrate the invention. In the Examples and experiments, percentages are based on the weight of the particular total mixture considered, unless stated otherwise.

The amounts, in percent by weight, of flameproofing agents (component D) and novolaks (component E) stated in Table 2 were mixed in a fluid mixer from Henschel, Kassel, at 40° C. The mixture of these components was then melted with the thermoplastic resins (components A+C), component F and, if required, the impact modifier (component B), in the amounts (percent by weight) also stated in Table 2, in an extruder at from 230° to 260° C., and the melt was homogenized and then granulated.

Standard test specimens for the UL 94 test were produced by injection molding of the granules.

TABLE 2

| Example No. | A % by weight | B % by weight | C % by weight | D % by weight | E % by weight | F % by weight | Classification UL 94 | Dripping of particles n.f.[1] | Dripping of particles f.[2] | VICAT heat distortion resistance DIN 53,460 (°C.) | Transparency |
|---|---|---|---|---|---|---|---|---|---|---|---|
| 1 | $A_1$,35 | 0 | $C_1$,35 | $D_1$,10 | $E_{15}$,10 | $F_1$,10 | V1 | no | no | 123 | very good |
| 2 | $A_1$,31.5 | 0 | $C_1$,31.5 | $D_2$,12 | $E_{15}$,10 | $F_1$,15 | V1 | no | no | 125 | very good |
| 3 | $A_1$,29 | 0 | $C_1$,29 | $D_1$,12 | $E_{15}$,10 | $F_1$,20 | V0 | no | no | 121 | very good |
| 4 | $A_1$,34 | 0 | $C_1$,34 | $D_4$,12 | $E_{15}$,10 | $F_2$,10 | V0 | no | no | 119 | very good |
| 5 | $A_1$,30 | 0 | $C_1$,30 | $D_5$,10 | $E_{15}$,10 | $F_2$,20 | V0 | no | no | 123 | good |
| 6 | $A_1$,27.5 | 0 | $C_1$,27.5 | $D_3$,10 | $E_{11}$,15 | $F_2$,20 | V1 | no | no | 118 | very good |
| 7 | $A_1$,30 | 0 | $C_1$,30 | $D_4$,10 | $E_{15}$,10 | $F_2$,20 | V0 | no | no | 120 | very good |
| 8 | $A_2$,23 | $B_7$,10 | $C_1$,35 | $D_2$,12 | $E_{15}$,10 | $F_3$,10 | V1 | no | no | 124 | moderate |
| 9 | $A_2$,28 | $B_7$,10 | $C_1$,40 | $D_5$,12 | $E_{15}$,10 | $F_3$,10 | V0 | no | no | 127 | moderate |
| Comparative experiments | | | | | | | | | | | |
| A | $A_1$,45 | 0 | $C_1$,45 | 0 | 0 | $F_1$,10 | none | yes | yes | 136 | very good |
| B | $A_1$,35 | 0 | $C_1$,35 | $D_1$,20 | 0 | $F_1$,10 | V1 | yes | no | 116 | very good |
| C | $A_1$,42.5 | 0 | $C_1$,42.5 | 0 | 0 | $F_1$,15 | none | yes | yes | 138 | very good |
| D | $A_1$,23.5 | 0 | $C_1$,32.5 | $D_2$,20 | 0 | $F_1$,15 | V1 | yes | no | 117 | very good |
| E | $A_1$,40 | 0 | $C_1$,40 | 0 | 0 | $F_1$,20 | none | yes | yes | 132 | very good |
| F | $A_1$,40 | 0 | $C_1$,40 | $D_1$,18 | 0 | $F_1$,20 | V0 | no | no | 114 | good |
| G | $A_1$,40 | 0 | $C_1$,40 | 0 | 0 | $F_2$,20 | none | yes | yes | 133 | very good |
| H | $A_1$,32.5 | 0 | $C_1$,32.5 | $D_5$,15 | 0 | $F_2$,20 | V0 | no | no | 117 | good |
| I | $A_2$,31.7 | $B_7$,10 | $C_1$,48.3 | 0 | 0 | $F_3$,10 | none | yes | yes | 136 | moderate |
| J | $A_2$,23.8 | $B_7$,10 | $C_1$,36.2 | $D_2$,20 | 0 | $F_3$,10 | V1 | yes | no | 112 | moderate |

[1]non-flaming;
[2]flaming

We claim:

1. A halogen-free self-extinguishing thermoplastic molding material comprising
   A: 3–97% by weight of a halogen-free thermoplastic resin which contains as copolymerized units
      (a1) from 60 to 91% by weight, based on A, of one or more vinylaromatic monomers from the group consisting of styrene, α-methylstyrene, p-methylstyrene or mixtures of these, and
      (a2) from 40 to 9% by weight, based on A, of acrylonitrile,
   B: from 0 to 40% by weight of an elastomer from the group consisting of polybutadiene, polyacrylates and copolymers of the monomers of these polymers, which has a glass transition temperature below 0° C. and is used in the form of a graft copolymer formed from monomers (a1) and (a2) of component A as the grafted shell and one of the above rubbers as a base,
   C: 97–3% by weight of a further halogen-free thermoplastic resin which differs from A,
   D: 0.5–40% by weight of a phosphorus-containing flameproofing agent and
   E: 4–30% by weight of a phenol/aldehyde resin,
the percentages in each case being based on the molding material consisting of A, B, C, D, E and F,
wherein component C is a poly(phenylene) ether of the general formula (I)

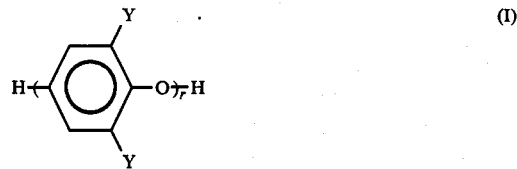

where Y is a monovalent substituent, such as H or a hydrocarbon radical which does not possess a tertiary carbon atom in the α-position and is of 1 to 25 carbon atoms or alkoxy of 1 to 25 carbon atoms, and r is an integer of from 20 to 200, and the molding material furthermore contains F: 0.3–95% by weight of a copolymer which consists of a main chain and one or more side chains attached to this by condensation, the main chain having a weight average molecular weight $\overline{M}_w$ of from 5,000 to 5 million and the side chain or chains each having a weight average molecular weight of from 2,000 to 80,000, determined by gel permeation chromatography, the main chain furthermore constitutes a terpolymer which contains, as copolymerized units, ($f_a$) 60–91% by weight of one or more vinylaromatic monomers of 8 or 9 carbon atoms, ($f_b$) 40–9% by weight of acrylonitrile and ($f_c$) 0.3–10% by weight of one or more monomers from the group consisting of the esters of acrylic acid and methacrylic acid which contain alcohol radicals capable of ether formation, and each side group possesses one or more poly(phenylene) ether radicals which bond the polymer of the side group to the monomer or monomers capable of ether formation, bonding taking place in each case via the radical of a bifunctional or polyfunctional coupling agent.

2. A halogen-free self-extinguishing thermoplastic molding material comprising

A: 3–97% by weight of a halogen-free thermoplastic resin which contains as copolymerized units ($a_1$) from 60 to 91% by weight, based on A, of one or more vinylaromatic monomers from the group consisting of styrene, α-methylstyrene, p-methylstyrene and mixtures of these and ($a_2$) from 40 to 9% by weight, based on A, of acrylonitrile, B: from 4 to 30% by weight of an elastomer from the group consisting of the polymers of butadiene and acrylates of alcohols of 2 to 8 carbon atoms and their copolymers, which has a glass transition temperature below 0° C. and is used in the form of a graft copolymer formed from monomers ($a_1$) and ($a_2$) of component A as the grafted shell and one of the abovementioned rubbers as the grafting base, the graft copolymer being composed of, in each case based on B, from 10 to 50% by weight of the monomers ($a_1$) and from 0.1 to 25% by weight of acrylonitrile as the grafted shell, and from 90 to 10% by weight of a polymer of butadiene or an acrylate of an alcohol of 2 to 8 carbon atoms or a copolymer of these as the grafting base, C: 97–3% by weight of a further halogen-free thermoplastic resin which differs from A, D: 0.5–40% by weight of a phosphorus-containing flameproofing agent and E: 4–30% by weight of a phenol/aldehyde resin, the percentages in each case being based on the molding material consisting of A, B, C, D, E and F, wherein component C is a poly(phenylene) ether of the general formula (I)

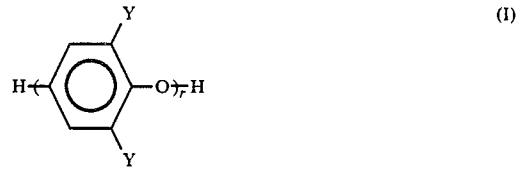

where Y is a monovalent substituent, such as H or a hydrocarbon radical which does not possess a tertiary carbon atom in the α-position and is of 1 to 25 carbon atoms or alkoxy of 1 to 25 carbon atoms, and r is an integer of from 20 to 200, and the molding material furthermore contains F: 0.3–95% by weight of a copolymer which consists of a main chain and one or more side chains attached to this by condensation, the main chain having a weight average molecular weight $\overline{M}_w$ of from 5,000 to 5 million and the side chain or chains each having a weight average molecular weight of from 2,000 to 80,000, determined by gel permeation chromatography, the main chain furthermore constitutes a terpolymer which contains, as copolymerized units, ($f_a$) 60–91% by weight of one or more vinylaromatic monomers of 8 or 9 carbon atoms, ($f_b$) 40–9% by weight of acrylonitrile and ($f_c$) 0.3–10% by weight of one or more monomers from the group consisting of the esters of acrylic acid and methacrylic acid which contain alcohol radicals capable of ether formation, and each side group possesses one or more unsubstituted or substituted poly(phenylene) ether radicals which bond the polymer of the side group to the monomer or monomers capable of ether formation, bonding taking place in each case via the radical of a bifunctional or polyfunctional coupling agent.

3. A molding material as claimed in clam 1, wherein poly(2,6-dimethylene-1,4-phenylene) ether is used as component C.

4. A molding material as claimed in claim 1, wherein the amount of the main chain is 20–85% by weight and that of the side chain or chains is 80–15% by weight, the percentages in each case being based on component F.

5. A molding material as claimed in claim 1, wherein hydroxybutyl acrylate is used as monomer $f_c$.

* * * * *